United States Patent [19]

von der Ohe

[11] Patent Number: 4,474,389
[45] Date of Patent: Oct. 2, 1984

[54] AXLE SUSPENSION FOR A PASSENGER MOTOR VEHICLE

[75] Inventor: Manfred von der Ohe, Stuttgart, Fed. Rep. of Germany

[73] Assignee: Daimler-Benz Aktiengesellschaft, Fed. Rep. of Germany

[21] Appl. No.: 334,074

[22] Filed: Dec. 23, 1981

[30] Foreign Application Priority Data

Dec. 23, 1980 [DE] Fed. Rep. of Germany ....... 3048864

[51] Int. Cl.³ ................................................ B60G 3/00
[52] U.S. Cl. ..................................... 280/701; 280/725
[58] Field of Search .............. 280/666, 667, 675, 690, 280/696, 701, 724, 725, 660

[56] References Cited

U.S. PATENT DOCUMENTS

| 2,122,476 | 7/1938 | Leighton | 280/696 |
|---|---|---|---|
| 3,189,118 | 6/1965 | Arning | 280/701 |
| 3,871,467 | 3/1975 | Senft et al. | 280/701 |
| 4,269,432 | 5/1981 | Inoue et al. | 280/690 |
| 4,273,356 | 6/1981 | Sakata et al. | 280/675 |

FOREIGN PATENT DOCUMENTS

| 1938850 | 5/1970 | Fed. Rep. of Germany | 280/660 |
|---|---|---|---|
| 2319943 | 11/1974 | Fed. Rep. of Germany | 280/690 |
| 2614285 | 10/1977 | Fed. Rep. of Germany | 280/675 |
| 2818198 | 10/1979 | Fed. Rep. of Germany | 280/690 |
| 1017678 | 1/1966 | United Kingdom | 280/701 |

OTHER PUBLICATIONS

*Racing Car Design and Development* by Len Terry and Alan Baker, published 1973, pp. 120 and 217.

*Primary Examiner*—Joseph F. Peters, Jr.
*Assistant Examiner*—Ross Weaver
*Attorney, Agent, or Firm*—Craig & Burns

[57] ABSTRACT

An axle arrangement, especially for a rear axle passenger motor vehicles, with the vehicles including independent suspended wheels. The axle arrangement includes a wheel guide having an upper and lower split link for a wheel carrier. An instantaneous center located, in a rear view of the axle arrangement, a longitudinally extending center point of the vehicle is determined through the upper and lower links of the wheel guide. The instantaneous center travels out of the longitudinal center plane of the vehicle toward one side of the vehicle during a cornering. The links are constructed and arranged such that the instantaneous center shifts toward an inside of a curve during a cornering of the motor vehicle.

20 Claims, 4 Drawing Figures

AXLE SUSPENSION FOR A PASSENGER MOTOR VEHICLE

The present invention relates to a suspension arrangement and, more particularly, to a rear axle suspension arrangement for passenger motor vehicles which are provided with wheels guided independently of one another, each wheel has a guide having an upper and lower link for a wheel carrier, with an instantaneous center, located in the longitudinal center plane of the vehicle with respect to an installed position, from a rear view, being determined by the upper and lower links of the wheel guide, which instantaneous center travels out of the longitudinal center plane of the vehicle toward one side of the vehicle during a cornering of the vehicle.

An axle of the aforementioned type is proposed in, for example, Figure 3.4/15 in Reimpell, volume 1, 1970, page 122, wherein a lower link is formed by a single-tier transverse link member which is articulated to the vehicle body and to a wheel carrier about a pivot axis extending in a longitudinal direction of the vehicle. An upper link is determined by a drive shaft extending between the wheel carrier and a rear axle gear unit. The lower link, supported with respect to the vehicle body by way of two springs, is relatively long, with the arrangement permitting a good transmission achieved for the springs and shock absorbers disposed therein, which transmission is desirable.

A disadvantage of the above proposed suspension arrangement resides in the fact that, with the arrangement of the upper and lower links, when the springs are unequally compressed, the instantaneous center shifts in a direction which leads to increased lifting of the vehicle body and the center of gravity in a direction toward an outside of the curve when the vehicle is cornering. Consequently, the wheel load differences between the inside and outside of the curve increase correspondingly, with the result being that the overall lateral guide force is reduced.

The aim underlying the present invention essentially resides in providing an axle suspension arrangement for a rear axle of a passenger motor vehicle provided with wheels guided independently of one another which increases an overall lateral guide force of the axle suspension during a cornering of the vehicle.

In accordance with the present invention, an axle suspension is provided wherein link members are constructed and arranged such that an instantaneous center shifts toward an inside of the curve. As a result of the shifting of the instantaneous center toward the inside of the curve, the wheel load differences between the wheel on the outside of the curve and the wheel on the inside of the curve may be reduced thereby resulting in an increase in the overall lateral guide force.

In accordance with the present invention, the lower link of the axle suspension has an axial length which is less than the axle length of the upper link.

Taking into account other prerequisites or demands made on a vehicle, certain difficulties are encountered especially when the lower link carries the suspension spring, since a shortening of the lower link results in increasing difficulties in providing the desirable high spring transmission. In accordance with the present invention, this difficulty is avoided by constructing the lower link as a split link including two struts, with the struts being independent of one another.

By virtue of the above noted constructional features of the present invention, one of the links of the split link, on which the spring is then arranged, may have a length greater than a length of a corresponding equivalent link utilized to determine an instantaneous center and which, in a rear view, presents itself as a distance between an ideal articulation point of the lower link on the wheel carrier and the point or intersection of the lower link with the wheel center transverse plane.

In accordance with the present invention, the spring carrying strut of the lower link, that is, the spring strut, is appropriately located behind a wheel-center transverse plane, and, in a plan view, the lower link extends obliquely rearwardly and inwardly from an articulation point on the wheel carrier side.

At the same time, the other strut of the lower link, functioning as a compression strut, is appropriately arranged to extend obliquely forwardly and inwardly, with the two struts being appropriately articulated on the wheel carrier in such a manner that the spring strut is articulated behind the wheel center transverse plane, and the compression strut is disposed forwardly of the spring strut.

Advantageously, in accordance with the present invention, it is possible, taking into account other requirements or demands made on a body of the vehicle, especially the guidance of an associated side member, to make the upper link as long as possible in comparison to the lower link since the upper link is also of a split construction including a pair of struts which appropriate determine an ideal upper articulation point for the wheel carrier. The articulation point is preferably offset outwardly with respect to a longitudinal plane of the wheel center.

With the above noted constructional features of the present invention, the so-called upper wishbone may be appropriate constructed so that, in a plan view, it is provided with a camber strut extending in a transverse direction and a tension strut extending obliquely forwardly and inwardly. An articulation point of the camber strut of the upper link on the wheel carrier side may preferably be located approximately in the wheel center transverse plane, while the corresponding articulation point of the tension strut may be located forwardly of the former articulation point with respect to a normal driving direction of the vehicle, in such a manner that the tension strut extends obliquely forwardly and inwardly.

Accordingly, it is an object of the present invention, to provide an axle suspension, especially a rear axle suspension for passenger motor vehicles having wheels guided independently of one another, which avoids, by simple means, shortcomings and disadvantages encountered in the prior art.

Another object of the present invention resides in providing a rear axle suspension for passenger motor vehicles which is simple in construction and therefore relatively inexpensive to manufacture.

Yet another object of the present invention resides in providing a rear axle suspension for passenger motor vehicles which increases overall lateral guiding forces during cornering of the motor vehicle.

A further object of the present invention resides in providing a rear axle for passenger motor vehicles which enables a shifting of an instantaneous center of the axle toward an inside of a curve when the vehicle is cornering.

These and other objects, features, and advantages of the present invention will become more apparent from the following description when taken in connection with the accompanying drawing which shows, for the purposes of illustration only, a single embodiment in accordance with the present invention, and wherein.

Figure 1:
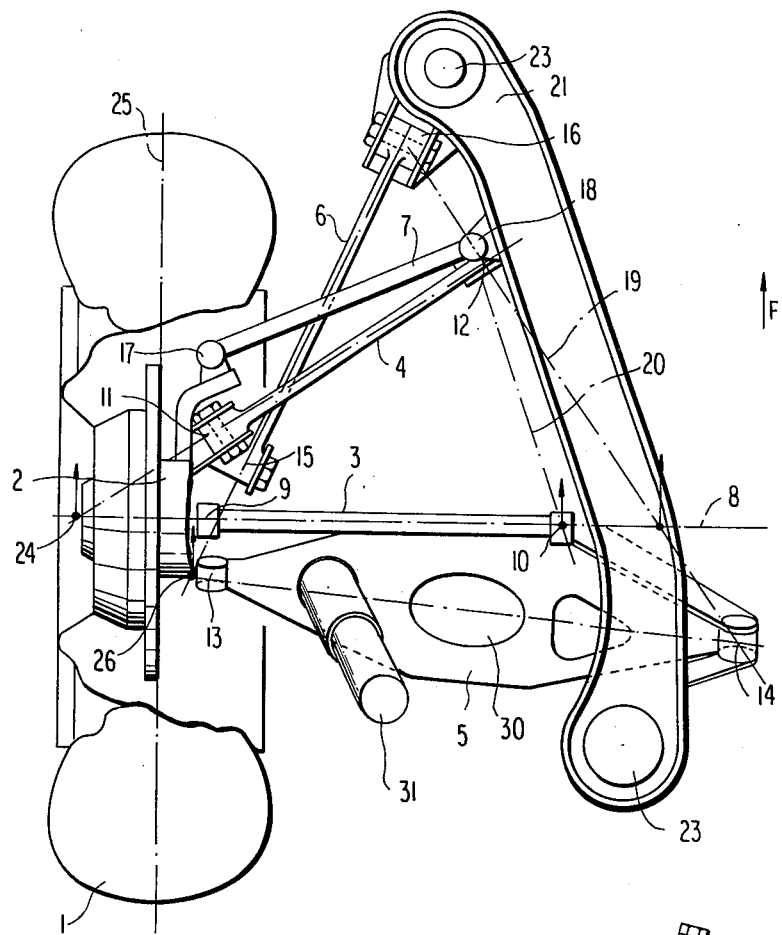
FIG. 1 is a partially schematic plan view of an axle arrangement associated with one side of an independent rear axle wheel suspension arrangement constructed in accordance with the present invention.
Figure 2:
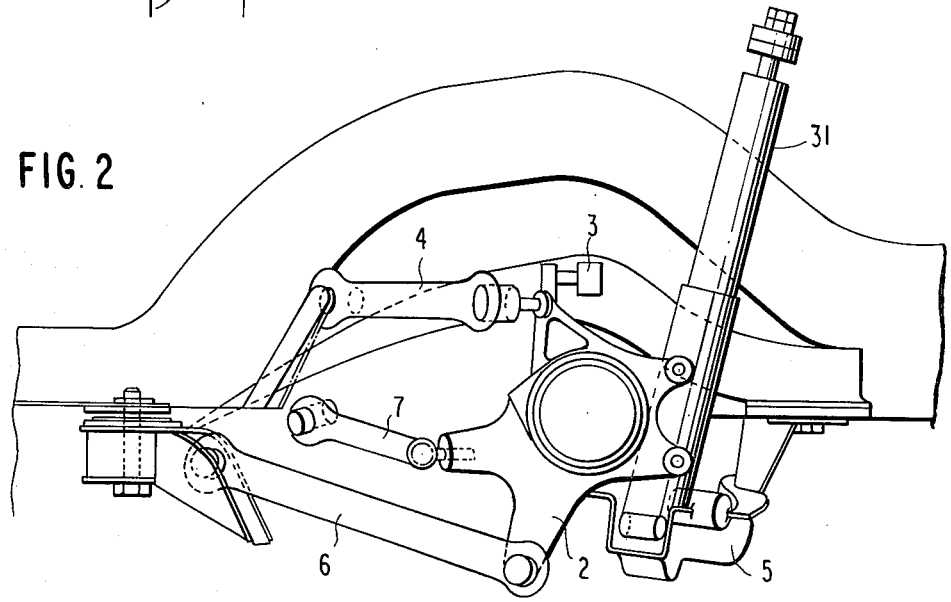
FIG. 2 is a side view of the wheel suspension arrangement of FIG. 1.
Figure 3:
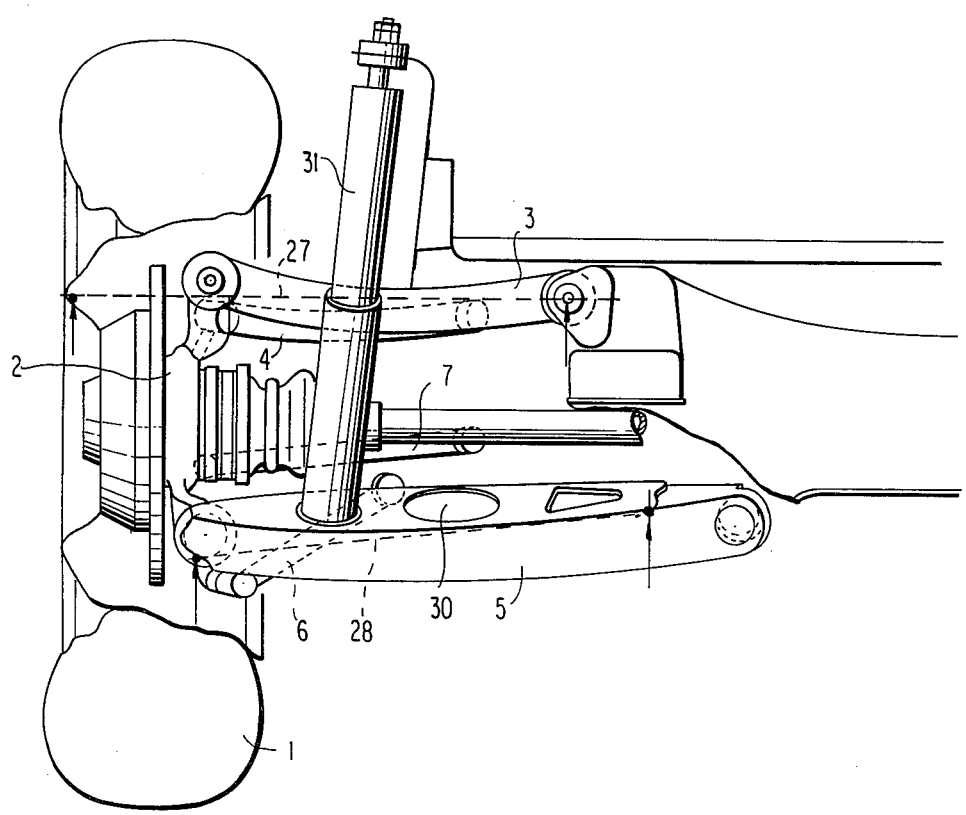
FIG. 3 is a partially schematic rear view of the suspension arrangement of FIG. 1.

Referring now to the drawings wherein like reference numerals are used to designate like parts and, more particularly, to FIGS. 1-3, according to these figures, an independent rear axle suspension for driven rear wheels 1 of a passenger motor vehicle (not shown) includes a wheel carrier 2 guided, on the one hand, by a split upper link means formed by a camber strut 3 and a tension strut 4 and, on the other hand, by a lower link means including a spring strut 5 and a compression strut 6. A track rod 7 is provided for guiding the wheel carrier 2. As can readily be appreciated, the second axle side of the independent rear suspension of the present invention is arranged and constructed as a mirror image of the illustrated side with respect to a vertically extending longitudinal center plane of the vehicle.

The camber strut 3 extends substantially horizontally and in a transverse direction of the vehicle, with a longitudinal center axis of the camber strut 3 being disposed essentially in a wheel center transverse plane 8. One end of the camber strut on a wheel carrier side is articulated to the wheel carrier at an articulation point 9, with a body side of the camber strut 3 being articulated to a portion of the vehicle body or chassis at an articulation point 10.

The tension strut 4 extends, in a plan view, (see FIG. 1) at an angle of approximately 35° to the camber strut 3, with an articulation point 11 of the tension strut 4 on the wheel carrier side being disposed forwardly of the wheel center transverse plane 8. The other end of the strut 4 on the body side is articulated at the articulation point 12. In a rear view, i.e. relative to the vehicle, the tension strut 4 is inclined slightly downwardly and outwardly with respect to the camber strut 3.

In a plan (see FIG. 1), the spring strut 5 of the lower link means is inclined slightly rearwardly with respect to the wheel center plane 8, as viewed in a normal driving direction F of the vehicle i.e., in the plan view the spring strut 5 extends from the wheel carrier generally rearwardly toward the vehicle body. The spring strut 5 is articulated on a wheel carrier side at an articulation point 13 and on a vehicle body side at an articulation point 14. In a rear view, the spring strut 5 extends substantially horizontally, with the articulation point 13 on the wheel carrier side being, in a plan view, offset rearwardly with respect to the wheel center transverse plane 8. An angle between the wheel center transverse plane 8 and a direction of extension of the spring strut 5, in a plan view, is equal to approximately 10°.

In a plan view, the compression strut 6 extends obliquely forwardly and inwardly at an angle of approximately 65° to the wheel center transverse plane 8 i.e., the compression strut 6 extends from the wheel carrier forwardly and upwardly relative to the vehicle body. The compression strut 6 is articulated on the wheel carrier side by an articulation point 15 and, on a body side of the vehicle by an articulation point 16. The articulation point 15 on the wheel carrier side is disposed at a distance forwardly of the wheel center transverse plane 8. In a plan view, a longitudinal center axis of the compression strut 6 extends approximately through the articulation point 9 of the camber strut 3 on the wheel carrier side.

The track rod 7 is articulated on the wheel carrier side at an articulation point 17 and, on a vehicle body side, at the articulation point 18. In a plan view (see FIG. 1), a track rod 7 forms an angle of approximately 25° with the wheel center transverse plane 8, and the articulation point 18 on the vehicle body side substantially coincides with the articulation point 12 of the tension strut 4 on the vehicle body side. The articulation point 11 of the tension strut 4 is disposed approximately centrally between the articulation point 15 of the compression strut 6 and articulation point 17 of the track rod 7, as viewed in a normal direction of driving F of the vehicle. The offset of the articualtion point 15 of the compression strut 6 with respect to the wheel center transverse plane 8 in the driving direction F corresponds approximately to a distance between the articulation point 13 of the spring strut on the wheel carrier side and the wheel center transverse plane 8 in the opposite direction.

The articulation points 14, 16 of the spring strut 5 and compression strut 6 form a theoretical pivot axis 19 of a lower wishbone. In a plan view, the articulation points 18 and 12 are disposed approximately on the pivot axis 19 which, in a plan view, forms an angle of approximately 55° opening outwardly with the wheel center transverse plane 8. A distance from the articulation points 18 and 12 to the articulation point 14 of the spring strut 5 corresponds to approximately four times a distance from the articulation points 12 and 18 to the articulation point 16 of the compression strut 6.

In a plan view (see FIG. 1), the theoretical pivot axis 20 of the upper link is determined by the articulation points 10, 12 of the camber strut 3 and the tension strut 4. The points of intersection of each of the pivot axes 19, 20 with the wheel center transverse plane 8 are offset in a transverse direction of the vehicle, with the intersection point of the pivot axis 19 located further inwardly relative to the vehicle body than the intersection point of the pivot axis 20.

In a rearview, the track rod 7 extends through the wheel center obliquely outwardly and downwardly relative to the vehicle body at an angle of approximately 5°-10° with respect to a horizontal line, while the compression strut 6 extends at an angle of approximately 35° obliquely outwardly and downwardly relative to the vehicle body with respect to the same horizontal reference line.

On a motor vehicle body side, all of the articulation points are disposed on a supporting body 21 which extends essentially in the driving direction F and is fastened to a portion of the body of the vehicle, in a conventional manner, at forward and rear ends through elastic support or mounting means 22, 23. The supporting body 21 forms an integral part of a subframe (not shown) of the motor vehicle which is provided with at least two connecting struts (not shown) extending in a transverse direction between two supporting bodies 21.

In the side view (see FIG. 2), the compression strut 6 and track rod 7 extend essentially parallel and at an angle of approximately 20° forwardly and upwardly relative to the vehicles body and with respect to a horizontally extending reference line (not shown). The spring strut 5 extends obliquely rearwardly and upwardly at an angle of approximately 10° with respect to the same horizontal reference straight line.

The upper and lower links of the suspension are constructed as split links with each link being composed of two struts so that ideal or optimum articulation points determining a vertical pivot axis of the wheel 1 are provided with respect to the wheel carrier 2. For the upper link, the ideal articulation point is located as an intersection point 24 of the longitudinal axes of the camber strut 3 and tension strut 4, which intersection point 24 is disposed outside of the wheel center longitudinal plate 25. For the lower link, the ideal articulation point is a point of intersection 26 which, in a plan view, is offset inwardly with respect to the wheel center longitudinal plane 25.

If, as indicated in FIG. 1, the articulation points 24 and 26 and the points of intersection of the axes 19 and 20 with the wheel center transverse plane 8 are projected into the rear view of FIG. 3, then so-called equivalent links are established for the split upper and lower links, with the equivalent links being indicated in phantom lines in FIG. 3 and being designated by the reference numeral 27 for the upper equivalent link and 28 for the lower equivalent link.

Figure 4:
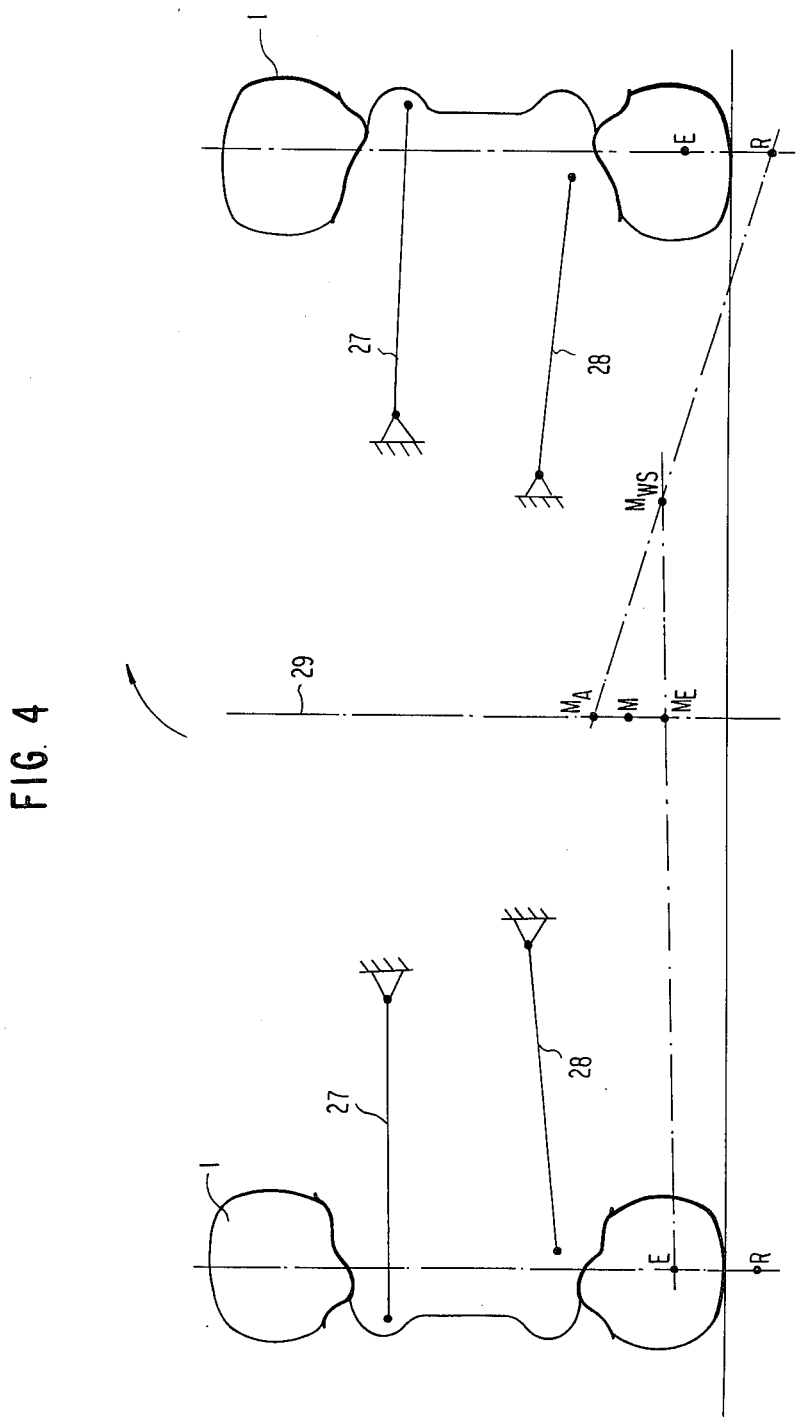
FIG. 4 is a schematic rear view of a complete rear axle assembly provided with a wheel suspension arrangement of FIGS. 1-3, with upper and lower links of the suspension being symbolized by equivalent links.

In the schematic representation of the suspension arrangement in FIG. 4, the equivalent links 27 and 28 are illustrated instead of the actual link and, as clearly shown in FIG. 4, the upper link 27 is longer than the lower link 28. Moreover, the schematic representation of FIG. 4 clearly indicates, on the longitudinal center plane 29 of the vehicle, the instantaneous centers for the two wheels 1 on the axle for both axle sides which instantaneous centers arise during equal compression and extension of both axle sides. In FIG. 4, the instantaneous centers are designated by the reference character M, with $M_A$ representing an instantaneous center for an extension and $M_E$ representing an instantaneous center for compression.

With the illustrated embodiment, if a cornering is considered, and, in particular, the conditions for executing a right hand curve, then the suspension of the outer i.e., left hand, wheel is compressed, while the inner i.e. right hand, wheel is extended and the intersection points of the two radius vectors provides an instantaneous center $M_{WS}$ when the springs are unequally compressed. The instantaneous center $M_{WS}$ is offset toward an inside of the curve with respect to the curve through which the motor vehicle is travelling, thereby resulting in obtaining a greater overall lateral guide force in comparison with an instantaneous center when the springs of the suspension arrangement are unequally compressed, which is offset toward an outside of the curve and not illustrated in the drawings.

The above results are obtained in the illustrated embodiment in spite of the favorable transmission ratio for the spring and shock absorber of the axle suspension. In this connection, a significant factor resides in the fact that the actual length of the spring strut 5 which, when a split link is constructed as proposed by the present invention, is greater than a corresponding length of the equivalent link 28. In this connection, as shown in FIGS. 1-3, the spring strut 5, spring 3, and shock absorber 31 are located or arranged with respect to one another on a longitudinal axis of the spring strut 5 so that no bearing distortion arises. A one piece construction of a lower link would not permit this since the spring 30 and shock absorber 31 would then each have to be located approximately along a straight line extending perpendicularly to the pivot axis 19 through the ideal articulation point 26 unless uneven loading of the articulation points 14 and 16 for the spring strut 5 and compression strut 6 is acceptable. However, in practice, the uneven loading is not possible if, as required for reasons of comfort in handling of the motor vehicle, the struts are each articulated elastically at least at one of their ends.

While I have shown and described only one embodiment in accordance with the present invention, it is understood that the same is not limited thereto but is susceptible of numerous changes and modifications as known to one having ordinary skill in the art, and I therefore do not wish to be limited to the details shown and described herein, but intend to cover all such modifications as are encompassed by the scope of the appended claims.

I claim:

1. An axle arrangement for motor vehicles having independently suspended wheels, the arrangement comprising wheel guide means for each of the wheels, each wheel guide means including upper link means and lower link means for supporting a wheel carrier at a body portion of the vehicle, each said upper link means constructed as a split link including a first strut and a second strut, an ideal upper articulation point for each wheel determined by an intersection of projected lines coaxial with the first strut and the second strut, each said ideal articulation point offset outwardly relative to the body portion and with respect to a longitudinally extending center plane of a respective wheel, said lower link means of each wheel guide means including a spring strut and a compression strut and having an equivalent lever length shorter than an equivalent lever length of the upper link means, said spring strut being adapted to carry a spring and, in the plan view, being located behind the vertical transverse plane of the wheel center, said spring strut having a length greater than the length of an equivalent link formed for the lower link means which, in the rear view, is the distance between an ideal lower articulation point determined by the intersection of projected lines coaxial with the spring strut and compression strut and the point of intersection of a swivel axis of the lower link means with the vertical transverse plane of the center of the wheel, an instantaneous center determined by the upper and lower link means, the instantaneous center being located in a longitudinally extending center plane of the vehicle, wherein the axle arrangement causes the instantaneous center to shift towards an inside of a curve during a cornering of the motor vehicle.

2. The axle arrangement according to claim 1, wherein the axle arrangement is a rear axle of a motor vehicle.

3. The axle arrangement according to claim 1, wherein when viewed in a plan view, each spring strut is disposed rearwardly of a transversely extending center plane of a respective wheel.

4. The axle arrangement according to claim 3, wherein each spring strut extends obliquely rearwardly, as viewed in a normal driving direction of the vehicle, and inwardly toward the longitudinal center plane of the vehicle from a point of articulation at the wheel carrier.

5. The axle arrangement according to claim 4, wherein each compression strut extends obliquely forwardly, as viewed in a normal driving direction of the vehicle, and inwardly toward the longitudinally extending center plane of the vehicle.

6. The axle arrangement according to claim 5, wherein each spring strut is articulated at the wheel carrier at a position disposed rearwardly of the transversely extending center plane of the respective wheel, and each compression is articulated at the wheel carrier forwardly of the first strut means.

7. The axle arrangement according to claim 1, wherein one of the first and second struts of each upper link means includes a camber strut extending in a transverse direction of the vehicle.

8. The axle arrangement according to claim 7, wherein the other of said first and second struts of each upper link means includes a tension strut extending obliquely forwardly, as viewed in a normal driving direction of the vehicle, and inwardly toward the longitudinally extending center plane of the vehicle.

9. The axle arrangement according to claim 8, wherein each strut is articulated at a respective wheel carrier at a point located approximately in the transversely extending center plane of the wheel, and each tension strut is articulated at the respective wheel carrier at a position forwardly of the articulation point of the camber strut, as viewed in a normal driving direction of the vehicle.

10. The axle arrangement according to one of claims 1 or 2, wherein each lower link means includes a compression strut extending obliquely forwardly, as viewed in a normal driving direction of the vehicle, and inwardly toward the longitudinally extending center plane of the vehicle.

11. The axle arrangement according to claim 10, wherein each lower link means includes a spring strut articulated at the respective wheel carrier at a position disposed rearwardly of a transversely extending center plane of the wheel, each compression strut is articulated at the respective wheel carrier at a position forwardly of the spring strut.

12. An axle arrangement for the rear of passenger cars having wheels that are guided independently of one another, comprising guiding means for each wheel having an upper and a lower link means for a wheel support, an instantaneous center determined by the upper and the lower link means of the wheel guiding means located in the longitudinal center plane of the vehicle, the lower link means having a lever length shorter than a lever length of the upper link means, said lower link means including a spring strut and a compression strut, the spring strut being adapted to carry a spring and, in the plan view, being located behind the vertical transverse plane of the wheel center, said spring strut having a length which is greater than the length of an equivalent link formed for the lower link means which, in a rear view, is the distance between an ideal lower articulation point determined by the intersection of projected lines coaxial with the spring strut and compression strut of the lower link means at the wheel support and the point of intersection of a swivel axis of the lower link means with the vertical transverse plane of the center of the wheel, wherein said instantaneous center, during the driving of turns, shifts from the longitudinal center plane of the vehicle toward the inside of the turn.

13. The axle arrangement according to claim 12, wherein the spring strut extends from a linkage point on the side of the wheel support diagonally backward and inward.

14. The axle arrangement according to claim 12, wherein the compression strut of the lower link means extends diagonally forward and inward.

15. The axle arrangement according to claim 14 wherein the compression strut is in front of the transverse plane of the center of the wheel and is linked to the wheel support.

16. The axle arrangement according to claim 12, wherein the upper link means is a split link means.

17. The axle arrangement according to claim 16, wherein a camber strut and tension strut of the split upper link means determines an imaginary upper articulation point for the wheel support by the projection of lines coaxial with said camber strut and tension strut.

18. The axle arrangement according to claim 16, wherein the upper link means includes a camber strut extending generally in a transverse direction.

19. The axle arrangement according to claim 18, wherein the upper link means includes a compression strut extending diagonally forward and inward.

20. The axle arrangement according to claim 19, wherein an articulation point of the camber strut proximate the wheel support is disposed approximately in the transverse plane of the wheel center, and a corresponding articulation point of the tension strut is disposed in front of the transverse plane of the wheel center relative to the driving direction.

* * * * *